(12) United States Patent
Groote et al.

(10) Patent No.: US 9,688,855 B2
(45) Date of Patent: *Jun. 27, 2017

(54) POLYCARBONATE-POLYSILOXANE COPOLYMER COMPOSITIONS FOR MOBILE PHONE HOUSING APPLICATIONS

(71) Applicant: SABIC GLOBAL TECHNOLOGIES B.V., Bergen Op Zoom (NL)

(72) Inventors: Ramon Groote, Oisterwijk (NL); James Franklin Hoover, Evansville, IN (US); Robert Dirk Van De Grampel, Tholen (NL); Mark Adrianus Johannes Van Der Mee, Breda (NL); Remco Wirtz, Bergen Op Zoom (NL); Jian Yang, Shanghai (CN); Junhua Zhang, Breda (NL)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/943,681

(22) Filed: Nov. 17, 2015

(65) Prior Publication Data

US 2017/0137621 A1    May 18, 2017

(51) Int. Cl.
    C08L 69/00    (2006.01)
    C08G 64/18    (2006.01)

(52) U.S. Cl.
    CPC ............ C08L 69/00 (2013.01); C08G 64/186 (2013.01); C08L 2205/02 (2013.01)

(58) Field of Classification Search
    None
    See application file for complete search history.

(56) References Cited

U.S. PATENT DOCUMENTS

| | | | |
|---|---|---|---|
| 4,746,701 A | 5/1988 | Kress et al. | |
| 5,530,083 A | 6/1996 | Phelps et al. | |
| 6,723,864 B2 * | 4/2004 | Silva | C08G 77/24 556/416 |
| 6,822,041 B2 | 11/2004 | Schottland et al. | |
| 7,135,538 B2 | 11/2006 | Glasgow et al. | |
| 7,166,687 B2 | 1/2007 | Venderbosch et al. | |
| 7,232,865 B2 | 6/2007 | DeRudder et al. | |
| 7,498,388 B2 | 3/2009 | Davis et al. | |
| 7,553,895 B2 | 6/2009 | An et al. | |
| 7,790,292 B2 | 9/2010 | Colborn et al. | |
| 7,928,168 B2 | 4/2011 | Li et al. | |
| 8,039,575 B2 | 10/2011 | Isozaki et al. | |
| 8,202,938 B2 | 6/2012 | Lee et al. | |
| 8,426,015 B2 | 4/2013 | Horisawa et al. | |
| 8,466,249 B2 | 6/2013 | Gallucci et al. | |
| 8,552,096 B2 | 10/2013 | Li et al. | |
| 8,962,780 B2 | 2/2015 | Higaki et al. | |
| 9,006,324 B2 | 4/2015 | Sybert et al. | |
| 9,023,912 B2 | 5/2015 | Morizur et al. | |
| 2004/0039145 A1 * | 2/2004 | Silva | C08G 77/448 528/25 |
| 2005/0085580 A1 | 4/2005 | Marugan et al. | |
| 2006/0014919 A9 | 1/2006 | Venderbosch et al. | |
| 2009/0023871 A9 * | 1/2009 | Fujiguchi | C08L 69/00 525/464 |

(Continued)

FOREIGN PATENT DOCUMENTS

| | | |
|---|---|---|
| EP | 0524731 A1 | 1/1993 |
| EP | 0524731 B1 | 3/2002 |

(Continued)

OTHER PUBLICATIONS

Ahmad et al; "Highly transparent thermoplastic elastomer from isotactic polypropylene and styrene/ethylene-butyiene/styrene triblock copolymer: Structure-property correlations"; Polymer Engineering & Science; vol. 50, No. 2; 2010; pp. 331-341.

Chen et al; "Effects of structure and annealing on the surface composition of multiblock copolymers of bisphenol A polycarbonate and poly(dimethylsiloxane)"; Macromolecules; vol. 26, No. 17; 1993; pp. 4601-4605.

Chen et al; "Surface Modification of Polymers by Blending Siloxane Block Copolymers"; Macromolecules; vol. 27, No. 12; 1994; pp. 3393-3369.

Choi et al; "Rheological properties and thermal degradation behaviors of sonochemically treated polycarbonate/polysiloxanes blends"; Korea-Australia Rheology Journal; vol. 20, No. 4; Dec. 2008; pp. 245-251.

Kim et al; "Surface and wear behavior of bis-(4-hydroxyphenyl) cyclohexane (bis-Z) polycarbonate/polycarbonate-polydimethylsiloxane block copolymer alloys"; Polymer; vol. 43, No. 25; 2002; pp. 7207-7217.

(Continued)

Primary Examiner — David Buttner
(74) Attorney, Agent, or Firm — Cantor Colburn LLP

(57) ABSTRACT

A polycarbonate composition comprises: 30 to 95 wt % of one or more bisphenol A polycarbonate homopolymers; and 5 to 70 wt % of a poly(carbonate-siloxane) copolymer with a siloxane content of 10 wt. % to 25 wt. % based on the total weight of the poly(carbonate-siloxane), in an amount effective to provide a total siloxane content of 0.5 wt. % to 17.5 wt. % based on the total weight of the composition; the poly(carbonate-siloxane) copolymer comprising bisphenol carbonate units and siloxane units of the formulas

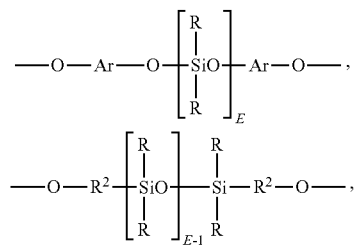

or a combination comprising at least one of the foregoing, wherein E has an average value of 10 to 100, preferably 20 to 60, more preferably 30 to 50; wherein in the poly (carbonate-siloxane) copolymer less than 0.5 mol % of the siloxane units are directly coupled to another siloxane units.

17 Claims, 1 Drawing Sheet

(56) References Cited

U.S. PATENT DOCUMENTS

| | | |
|---|---|---|
| 2009/0088514 A1 | 4/2009 | Shiping |
| 2012/0252985 A1 | 10/2012 | Rosenquist et al. |
| 2012/0273738 A1 | 11/2012 | Sybert et al. |
| 2014/0027531 A1 | 1/2014 | Rapchak |
| 2014/0058023 A1 | 2/2014 | Wan et al. |
| 2014/0179821 A1 | 6/2014 | Morizur et al. |
| 2014/0179843 A1 | 6/2014 | Van Der Mee et al. |
| 2014/0234629 A1 | 8/2014 | Sun et al. |
| 2014/0326162 A1 | 11/2014 | Van Der Mee et al. |
| 2014/0357781 A1 | 12/2014 | Yang et al. |
| 2015/0018477 A1 | 1/2015 | Lee et al. |
| 2015/0119483 A1 | 4/2015 | Sybert et al. |

FOREIGN PATENT DOCUMENTS

| | | | |
|---|---|---|---|
| JP | 2011102364 A | 5/2011 | |
| WO | 2013175448 A1 | 11/2013 | |
| WO | 2014032616 A1 | 3/2014 | |
| WO | 2014072923 A1 | 5/2014 | |
| WO | 2014136879 A1 | 9/2014 | |

OTHER PUBLICATIONS

Pesetskii et al; "Blends of polycarbonate and polysulphone-polydimethyl-siloxane block copolymers: analysis of compatibility and impact strength"; Journal of Applied Polymer Science; vol. 73, No. 10; 1999; pp. 1823-1834.

Schmitt et al; "Study of surface composition and morphology of block copolymers of bisphenol A polycarbonate and poly(dimethylsiloxane) by x-ray photoelectron spectroscopy and ion scattering spectroscopy"; Macromolecules; vol. 18 No. 12; 1985; 5 pages.

Van Aert et al, "Poly(bisphenol A carbonate)-poly(dimethylsiloxane) multibiock copolymers"; Polymer; vol. 42, No. 5; 2001; pp. 1781-1788.

Ward et al; "Inverse gas chromatography studies of poly(dimethylsiloxane)-polycarbonate copolymers and blends"; Macromolecules; vol. 14, No. 6; 1981; pp. 1791-797.

Yang et al; "Quantitative Morphology Characterization of New PC-siloxane Copolymer Blends"; Microscopy Society of America; vol. 20, No. 3; 2014; pp. 1934-1935.

Zhou et al; "Sioxane modfcaton of polycarbonate for superior flow and impact toughness"; Polymer; vol. 51, No. 9; 2010; pp. 1990-1999.

Groote et al., U.S. Appl. No. 14/943,651, titled "Polycarbonate-Polysiloxane Copolymer Compositions, Articles Formed Therefrom, and Methods of Manufacture Thereof", filed with the USPTO on Nov. 17, 2015.

Groote et al., U.S. Appl. No. 14/943,714, titled "Polycarbonate-Polysiloxane Copolymer Compositions, Articles Formed Therefrom, and Methods of Manufacture Thereof" filed with the USPTO on Nov. 17, 2015.

JP H1046022; Published Feb. 17, 1998, English Abstract Only: 1 page.

KR 2013077772 A; Published Jul. 9, 2013; English Abstract Only; 1 page.

\* cited by examiner

POLYCARBONATE-POLYSILOXANE COPOLYMER COMPOSITIONS FOR MOBILE PHONE HOUSING APPLICATIONS

BACKGROUND

This disclosure relates to polycarbonate compositions, and in particular to polycarbonate-polysiloxane copolymer compositions, methods of manufacture, and uses thereof.

Polycarbonates are useful in a wide variety of applications at least in part because of their good balance of properties, such as moldability, heat resistance and impact properties, among others. Despite extensive research on these materials over the years, there still remains a need in the art for improved polycarbonate compositions that meet increasingly stringent industry standards for consumer electronics such as mobile phone housing applications.

There accordingly remains a need in the art for polycarbonate compositions that can meet all the current requirements of mobile phone housing applications including good low temperature impact, chemical resistance and good aesthetics.

SUMMARY

The above-described and other deficiencies of the art are met by a polycarbonate composition comprising: 30 to 95 wt % of one or more bisphenol A polycarbonate homopolymers; and 5 to 70 wt % of a poly(carbonate-siloxane) copolymer with a siloxane content of 10 wt. % to 25 wt. % based on the total weight of the poly(carbonate-siloxane), in an amount effective to provide a total siloxane content of 0.5 wt. % to 17.5 wt. % based on the total weight of the composition; the poly(carbonate-siloxane) copolymer comprising bisphenol carbonate units of the formula

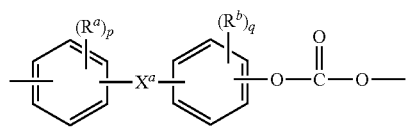

wherein $R^a$ and $R^b$ are each independently $C_{1-12}$ alkyl, $C_{1-12}$ alkenyl, $C_{3-8}$ cycloalkyl, or $C_{1-12}$ alkoxy, p and q are each independently 0 to 4, and $X^a$ is a single bond, —O—, —S—, —S(O)—, —S(O)$_2$—, —C(O)—, a $C_{1-11}$ alkylidene of formula —C($R^c$)($R^d$)— wherein $R^c$ and $R^d$ are each independently hydrogen or $C_{1-10}$ alkyl, or a group of the formula —C(=$R^e$)— wherein $R^e$ is a divalent $C_{1-10}$ hydrocarbon group; and siloxane units of the formulas

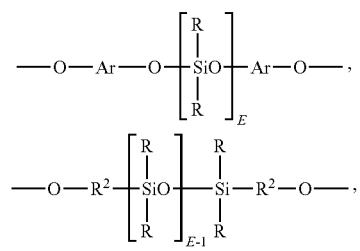

or a combination comprising at least one of the foregoing, wherein R is each independently a $C_{1-13}$ monovalent hydrocarbon group, Ar is each independently a $C_{6-30}$ aromatic group, $R^2$ is each independently a $C_{2-8}$ alkylene group, and E has an average value of 10 to 100, preferably 20 to 60, more preferably 30 to 50; wherein in the poly(carbonate-siloxane) copolymer less than 0.5 mol % of the siloxane units are directly coupled to another siloxane units; and further wherein the composition has a tensile yield strength retention of 80% and higher after exposure of an ISO tensile bar for 24 hours to sunscreen under 0.5% strain compared to a non-exposed reference tested according to ISO 22088-3; and an elongation at break retention of 75% and higher after exposure of an ISO tensile bar for 24 hours to sunscreen under 0.5% strain compared to a non-exposed reference tested according to ISO 22088-3.

In another embodiment, an article selected from a molded article, a thermoformed article, an extruded film, an extruded sheet, a honeycomb structure, one or more layers of a multi-layer article, a substrate for a coated article, and a substrate for a metallized article comprises the above-described polycarbonate composition.

In yet another embodiment, a method of manufacture of an article comprises molding, extruding, casting, or shaping the above-described polycarbonate composition into an article.

The above described and other features are exemplified by the following Drawings, Detailed Description, and Examples.

BRIEF DESCRIPTION OF THE DRAWINGS

A description of the figures, which are meant to be exemplary and not limiting, is provided in which.

DETAILED DESCRIPTION

Figure 1:
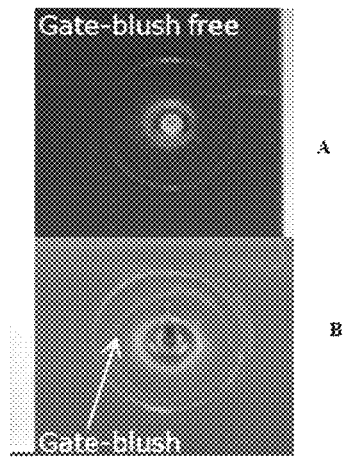
FIG. 1 illustrates a gate-blush free sample and a sample showing the appearance of blush around the gate.

The inventors hereof have discovered that polycarbonate compositions having a balanced impact, chemical resistance, and aesthetic properties can unexpected be obtained by combining a polycarbonate homopolymer with a poly(carbonate-siloxane) copolymer having a siloxane content of 10 wt. % to 25 wt. % based on the total weight of the poly(carbonate-siloxane) and having less than 0.5 mol % of the siloxane units directly coupled to another siloxane units. Without wishing to be bound by theory, it is believed that the unexpected combination of impact, chemical resistance, and aesthetic properties is achieved by careful selection and balancing of the weight percent of the siloxane units in the poly(carbonate-siloxane) copolymer as well as controlling the distribution of siloxane units in the poly(carbonate-siloxane) copolymer.

In particular, at the same total siloxane loading level, compositions containing the same polycarbonate but a poly(carbonate-siloxane) copolymer having a siloxane content greater than 25 wt. % based on the total weight of the poly(carbonate-siloxane) have poor aesthetic properties; and compositions containing the same polycarbonate but a poly(carbonate-siloxane) copolymer having a siloxane content less than 10 wt. % based on the total weight of the poly(carbonate-siloxane) have poor chemical resistance. Further, at the same total siloxane loading level, compositions containing the same polycarbonate and a poly(carbonate-siloxane) copolymer having a siloxane content of 10 wt. % to 25 wt. % but with greater than 0.5 mol % of siloxane units directly coupled to another siloxane units also have poor aesthetic properties.

The polycarbonate compositions according to the disclosure have balanced impact, chemical resistance, and aesthetic properties. Advantageously the disclosed polycarbonate compositions have a tensile yield strength retention of 80% and higher after exposure of an ISO tensile bar for 24 hours to sunscreen under 0.5% strain compared to a non-exposed reference tested according to ISO 22088-3; and an elongation at break retention of 75% and higher after exposure of an ISO tensile bar for 24 hours to sunscreen under 0.5% strain compared to a non-exposed reference tested according to ISO 22088-3. The polycarbonate compositions have a melt volume rate ("MVR"), determined in accordance with ASTM D1238 under a load of 1.2 kg at 300° C., higher than 5 and a ductile/brittle transition temperature of less than or equal to −10° C. determined in accordance with ASTM D256-2010 on a molded part having a thickness of 3.2 mm. Moreover, a molded article of the polycarbonate compositions passes a ball drop impact test without failure after dropping a steel ball of 500 g from a height of 500 mm after Non Conductive Vacuum Metallization (NCVM). And a molded article of the polycarbonate compositions with a thickness of 3.2 mm thickness has a transmission higher than 50% and a haze less than 25%, measured by HazeGard (ASTM D1003-00). The polycarbonate compositions can advantageously be used in consumer electronic applications such as mobile phone housing applications.

The individual components of the compositions are described in more detail below.

Bisphenol A polycarbonate homopolymer has repeating structural carbonate units of the formula (1)

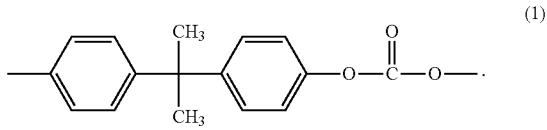

(1)

Bisphenol A polycarbonate homopolymer can be manufactured by processes such as interfacial polymerization and melt polymerization, which are known, and are described, for example, in WO 2013/175448 A1 and WO 2014/072923 A1, from bisphenol A (BPA). An end-capping agent (also referred to as a chain stopper agent or chain terminating agent) can be included during polymerization to provide end groups, for example monocyclic phenols such as phenol, p-cyanophenol, and $C_1$-$C_{22}$ alkyl-substituted phenols such as p-cumyl-phenol, resorcinol monobenzoate, and p- and tertiary-butyl phenol, monoethers of diphenols, such as p-methoxyphenol, monoesters of diphenols such as resorcinol monobenzoate, functionalized chlorides of aliphatic monocarboxylic acids such as acryloyl chloride and methacryloyl chloride, and mono-chloroformates such as phenyl chloroformate, alkyl-substituted phenyl chloroformates, p-cumyl phenyl chloroformate, and toluene chloroformate. Phenol and para-cumylphenol are specifically mentioned. Combinations of different end groups can be used. Branched polycarbonate blocks can be prepared by adding a branching agent during polymerization, for example trimellitic acid, trimellitic anhydride, trimellitic trichloride, tris-p-hydroxyphenylethane, isatin-bis-phenol, tris-phenol TC (1,3,5-tris((p-hydroxyphenyl)isopropyl)benzene), tris-phenol PA (4(4 (1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents can be added at a level of 0.05 to 2.0 wt. %. Combinations comprising linear polycarbonates and branched polycarbonates can be used.

In an embodiment, the bisphenol A polycarbonate homopolymer is a linear bisphenol A polycarbonate homopolymer having a weight average molecular weight of 10,000 to 100,000 Daltons, specifically 15,000 to 50,000 Daltons, more specifically 17,000 to 35,000 Daltons, as measured by gel permeation chromatography (GPC), using a crosslinked styrene-divinylbenzene column and calibrated to polycarbonate references. GPC samples are prepared at a concentration of 1 mg per ml, and are eluted at a flow rate of 1.5 ml per minute.

More than one bisphenol A polycarbonate homopolymer can be present. For example, the polycarbonate compositions can comprise a first bisphenol A polycarbonate homopolymer having a weight average molecular weight of 20,000 Daltons to 25,000 Daltons as measured by GPC using BPA polycarbonate standards and a second bisphenol A polycarbonate homopolymer having a weight average molecular weight of 28,000 to 32,000 Daltons, or a second bisphenol A polycarbonate homopolymer having a weight average molecular weight of 16,000 Daltons to 19,000 Daltons, each measured by GPC using BPA polycarbonate standards. The weight ratio of the first bisphenol A polycarbonate homopolymer relative to the second bisphenol A polycarbonate homopolymer is 10:1 to 1:10, specifically 5:1 to 1:5, more specifically 3:1 to 1:3 or 2:1 to 1:2.

The composition further comprises a polycarbonate-polysiloxane copolymer, also referred to as a poly(carbonate-siloxane). The poly(carbonate-siloxane) comprises carbonate units and siloxane units. The carbonate units are bisphenol carbonate units of the formula (2)

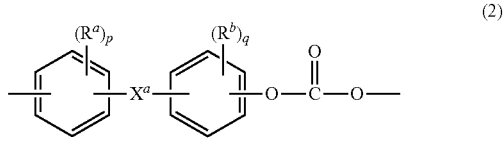

(2)

wherein $R^a$ and $R^b$ are each independently $C_{1-12}$ alkyl, $C_{1-12}$ alkenyl, $C_{3-8}$ cycloalkyl, or $C_{1-12}$ alkoxy, p and q are each independently 0 to 4, and $X^a$ is a single bond, —O—, —S—, —S(O)—, —S(O)$_2$—, —C(O)—, a $C_{1-11}$ alkylidene of formula —C($R^c$)($R^d$)— wherein $R^c$ and $R^d$ are each independently hydrogen or $C_{1-10}$ alkyl, or a group of the formula —C(=$R^e$)— wherein $R^e$ is a divalent $C_{1-10}$ hydrocarbon group The carbonate units can be derived from a dihydroxy compound such as a bisphenol of formula (3).

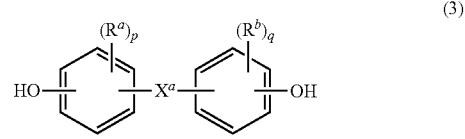

(3)

In formula (3), $R^a$, $R^b$, $X^a$, p, and q are the same as those defined in the context of formula (2).

Examples of bisphenol compounds include 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis (hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantane, alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorene, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole; resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like.

Specific dihydroxy compounds include 2,2-bis(4-hydroxyphenyl) propane ("bisphenol A" or "BPA"), 3,3-bis(4-hydroxyphenyl) phthalimidine, 2-phenyl-3,3'-bis(4-hydroxyphenyl) phthalimidine (also known as N-phenyl phenolphthalein bisphenol, "PPPBP", or 3,3-bis(4-hydroxyphenyl)-2-phenylisoindolin-1-one), 1,1-bis(4-hydroxy-3-methylphenyl)cyclohexane, and 1,1-bis(4-hydroxy-3-methylphenyl)-3,3,5-trimethylcyclohexane (isophorone bisphenol).

The siloxane units (also referred to as polysiloxane blocks) are of formula (4)

wherein each R is independently a $C_{1-13}$ monovalent organic group. For example, R can be a $C_1$-$C_{13}$ alkyl, $C_1$-$C_{13}$ alkoxy, $C_2$-$C_{13}$ alkenyl, $C_2$-$C_{13}$ alkenyloxy, $C_3$-$C_6$ cycloalkyl, $C_3$-$C_6$ cycloalkoxy, $C_6$-$C_{14}$ aryl, $C_6$-$C_{10}$ aryloxy, $C_7$-$C_{13}$ arylalkyl, $C_7$-$C_{13}$ aralkoxy, $C_7$-$C_{13}$ alkylaryl, or $C_7$-$C_{13}$ alkylaryloxy. The foregoing groups can be fully or partially halogenated with fluorine, chlorine, bromine, or iodine, or a combination thereof. In an embodiment, where a transparent polycarbonate-polysiloxane is desired, R is unsubstituted by halogen. Combinations of the foregoing R groups can be used in the same copolymer.

The value of E in formula (4) can vary widely depending on the type and relative amount of each component in the polycarbonate composition, the desired properties of the composition, and like considerations. Generally, E has an average value of 10 to 100, preferably 20 to 60, more preferably 30 to 50.

In an embodiment, the siloxane units are of formula (5)

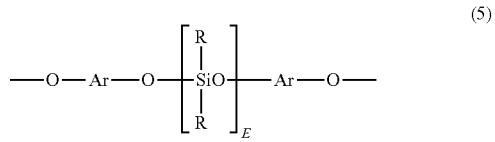

wherein E is as defined above in the context of formula (4); each R can be the same or different, and is as defined above in the context of formula (4); and Ar can be the same or different, and is a substituted or unsubstituted $C_6$-$C_{30}$ arylene, wherein the bonds are directly connected to an aromatic moiety. Ar groups in formula (5) can be derived from a $C_6$-$C_{30}$ dihydroxyarylene compound, for example a dihydroxy compound of formula (3). Exemplary dihydroxyarylene compounds are 1,1-bis(4-hydroxyphenyl) methane, 1,1-bis(4-hydroxyphenyl) ethane, 2,2-bis(4-hydroxyphenyl) propane, 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxyphenyl) cyclohexane, bis(4-hydroxyphenyl sulfide), and 1,1-bis(4-hydroxy-t-butylphenyl) propane. Combinations comprising at least one of the foregoing dihydroxy compounds can also be used.

Specific examples of siloxane units of formula (5) include those of the formulas (5a) and (5b):

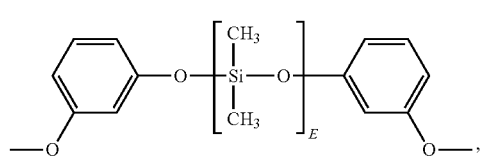

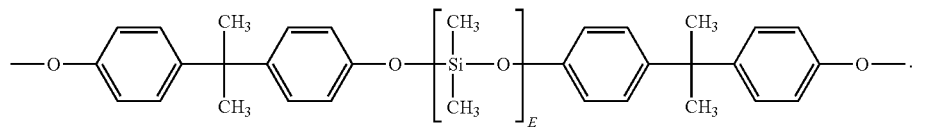

In another embodiment, the siloxane units are of formula (6)

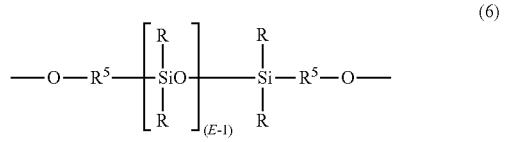

wherein R and E are as described above in the context of formula (4), and each $R^5$ is independently a divalent $C_1$-$C_{30}$ organic group, and wherein the polymerized polysiloxane unit is the reaction residue of its corresponding dihydroxy compound. In a specific embodiment, the polydiorganosiloxane blocks are of formula (7):

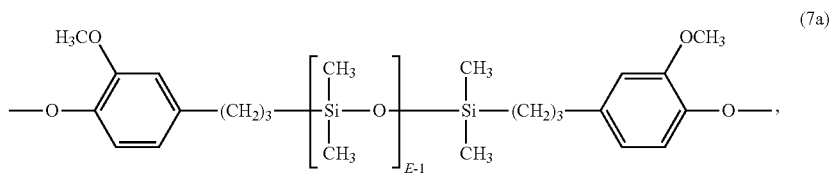

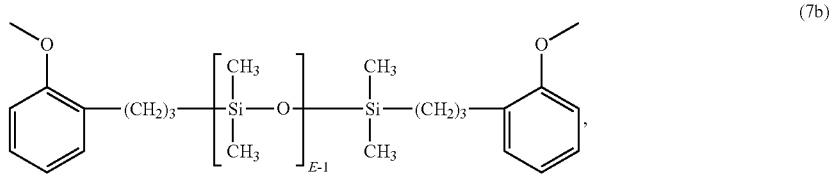

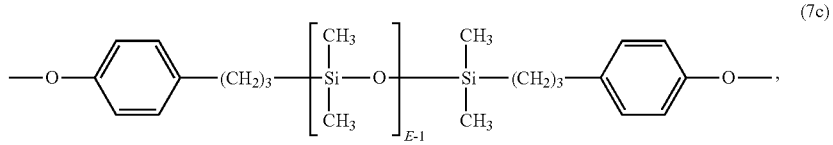

wherein R and E are as defined above in the context of formula (4). $R^6$ in formula (7) is a divalent $C_2$-$C_8$ aliphatic. Each M in formula (7) can be the same or different, and can be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, wherein each n is independently 0, 1, 2, 3, or 4.

In an embodiment, M is bromo or chloro, an alkyl such as methyl, ethyl, or propyl, an alkoxy such as methoxy, ethoxy, or propoxy, or an aryl such as phenyl, chlorophenyl, or tolyl; $R^6$ is a dimethylene, trimethylene or tetramethylene; and R is a $C_{1-8}$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, R is methyl, M is methoxy, n is one, $R^6$ is a divalent $C_1$-$C_3$ aliphatic group. Specific polydiorganosiloxane blocks are of the formula or a combination comprising at least one of the foregoing, wherein E has an average value of 10 to 100, preferably 20 to 60, more preferably 30 to 50, or 40 to 50.

Blocks of formula (7) can be derived from the corresponding dihydroxy polydiorganosiloxane of formula (8),

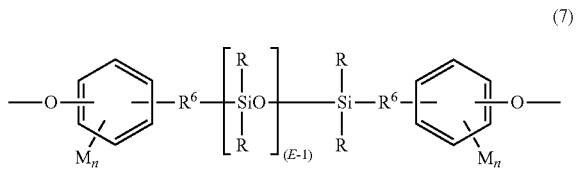

which in turn can be prepared effecting a platinum-catalyzed addition between the siloxane hydride and an aliphatically unsaturated monohydric phenol such as eugenol, 2-alkylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol.

The polycarbonate-polysiloxane copolymers can then be manufactured using one or more of the tube reactor processes described in U.S. Patent Application Publication No. 2004/0039145, or the process described in U.S. Pat. No. 6,723,864, or the process described in U.S. Pat. No. 8,466,249.

In an embodiment, the polycarbonate-polysiloxane copolymers comprise carbonate units derived from bisphenol A, and repeating siloxane units (5a), (5b), (7a), (7b), (7c), or a combination comprising at least one of the foregoing (specifically of formula 7a), wherein E has an average value of E has an average value of 10 to 100, preferably 20 to 60, more preferably 30 to 50 or 40 to 50.

The polycarbonate-polysiloxane copolymers have a siloxane content of 10 to 25 wt %, based on the total weight of the polycarbonate-polysiloxane copolymers. As used herein, the siloxane content of a polycarbonate-polysiloxane refers to the weight percent of the siloxane units based on the total weight of the polycarbonate-polysiloxane copolymer. When the polycarbonate-polysiloxane copolymers have a siloxane content of greater than 25 wt % based on the total weight of the polycarbonate-polysiloxane copolymers, the polycarbonate compositions may have less than desirable aesthetic properties. When the polycarbonate-polysiloxane copolymers have a siloxane content of less than 10 wt % based on the total weight of the polycarbonate-polysiloxane copolymers, the polycarbonate compositions may have poor chemical resistance.

Generally, a polycarbonate-polysiloxane block copolymer can be considered as being formed from a bisphenol of Formula (3) and a dihydroxy polydiorganosiloxane of formula (8), with carbonate linkages between these monomers. There are potentially three types of linkages between the carbonate blocks (C) and siloxane blocks (S). Illustratively these linkages are C-C, S-S, and C-S. The inventors hereof have found that the in order to provide a polycarbonate composition having balanced impact, chemical resistance, and aesthetics, the type of linkages between the carbonate units and the siloxane units in the polycarbonate-polysiloxane copolymers should be controlled. In the polysiloxane-polycarbonate, less than 0.5 mol % of the siloxane units are directly coupled to another siloxane units, specifically less than 0.2 mol % of the siloxane units are directly coupled to another siloxane units, more specifically less than 0.1 mol % of the siloxane units are directly coupled to another siloxane units.

In an embodiment, the polycarbonate composition comprises 30 wt % to 95 wt % of the one or more bisphenol A polycarbonate homopolymers; and 5 wt % to 70 wt % of the poly(carbonate-siloxane), each based on the total weight of the polycarbonate composition. The poly(carbonate-siloxane) is effective to provide a total siloxane content of 0.5 wt. % to 17.5 wt %, specifically 1 wt % to 14 wt %, more specifically 1.5 wt % to 12 wt %, or 2 wt % to 12 wt. %, each based on the total weight of the polycarbonate composition. The poly(carbonate-siloxane) can be present in an amount of 5 to 40 wt. % based on the sum of the weights of the bisphenol A polycarbonate homopolymer and the poly(carbonate-siloxane). The poly(carbonate-siloxane) can also be present in an amount of 10 to 30 wt. % based on the sum of the weights of the bisphenol A polycarbonate homopolymer and the poly(carbonate-siloxane).

In addition to the bisphenol A polycarbonate homopolymer and the poly(carbonate-siloxane), the polycarbonate composition can optionally include various additives ordinarily incorporated into polymer compositions of this type, with the proviso that the additive(s) are selected so as to not significantly adversely affect the desired properties of the polycarbonate composition, in particular impact, chemical resistance, and aesthetics. Additives include fillers, reinforcing agents, antioxidants, heat stabilizers, light stabilizers, ultraviolet (UV) light stabilizers, plasticizers, lubricants, mold release agents, antistatic agents, colorants such as such as titanium dioxide, carbon black, and organic dyes, surface effect additives, radiation stabilizers, flame retardants, and anti-drip agents. A combination of additives can be used, for example a combination of a heat stabilizer, mold release agent, and ultraviolet light stabilizer. In general, the additives are used in the amounts generally known to be effective. For example, the total amount of the additives (other than any impact modifier, filler, or reinforcing agents) can be 0.01 to 5 wt. %, based on the total weight of the polycarbonate composition. In an embodiment, the polycarbonate composition comprises no more than 5 wt. % based on the weight of the composition of a processing aid, a heat stabilizer, an antioxidant, an ultra violet light absorber, or a combination comprising at least one of the foregoing.

The polycarbonate compositions can optionally include a colorant composition containing pigment and/or dye additives. Useful pigments can include, for example, inorganic pigments such as metal oxides and mixed metal oxides such as zinc oxide, titanium dioxides, iron oxides, or the like; sulfides such as zinc sulfides, or the like; aluminates; sodium sulfo-silicates sulfates, chromates, or the like; carbon blacks; zinc ferrites; ultramarine blue; organic pigments such as azos, di-azos, quinacridones, perylenes, naphthalene tetracarboxylic acids, flavanthrones, isoindolinones, tetrachloroisoindolinones, anthraquinones, enthrones, dioxazines, phthalocyanines, and azo lakes; Pigment Red 101, Pigment Red 122, Pigment Red 149, Pigment Red 177, Pigment Red 179, Pigment Red 202, Pigment Violet 29, Pigment Blue 15, Pigment Blue 60, Pigment Green 7, Pigment Yellow 119, Pigment Yellow 147, Pigment Yellow 150, and Pigment Brown 24; or combinations comprising at least one of the foregoing pigments.

Dyes are generally organic materials and include coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3'''',5''''-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene, chrysene, rubrene, coronene, or the like; or combinations comprising at least one of the foregoing dyes.

The composition can have any suitable color including white, gray, light gray, black, and the like. The white or light gray color can exhibit an L* value greater than or equal to 80. A composition having a white or light gray color can comprise an amount of titanium dioxide in amounts of 0.1 to 30 wt. %, 0.1 to 25 wt. %, 0.1 to 20 wt. %, or 0.1 to 15 wt. %, each based on the total weight of the polycarbonate composition.

The gray or black color can exhibit an L* value of below 80. A composition having a gray or black color can comprise an amount of carbon black of greater than zero and less than 1.5 wt. % based on the total weight of the colorant composition. In an embodiment, a molded sample having a thickness of 1 mm formed from the composition has an average L* value of 29 or less as measure by the CIE Lab method, 10 degree observer, D65 illuminant, specular component included, measured in reflectance mode.

The polycarbonate compositions may optionally include flame retardants. Various types of flame retardants can be utilized. In one embodiment, the flame retardant additives include, for example, flame retardant salts such as alkali metal salts of perfluorinated $C_1$-$C_{16}$ alkyl sulfonates such as potassium perfluorobutane sulfonate (Rimar salt), potassium perfluoroctane sulfonate, tetraethylammonium perfluorohexane sulfonate, potassium diphenylsulfone sulfonate (KSS), and the like, sodium benzene sulfonate, sodium toluene sulfonate (NATS) and the like; and salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or fluoro-anion complex such as $Li_3AlF_6$, $BaSiF_6$, $KBF_4$, $K_3AlF_6$, $KAlF_4$, $K_2SiF_6$, and/or $Na_3AlF_6$ or the like. Rimar salt and KSS and NATS, alone or in combination with other flame retardants, are particularly useful in the compositions disclosed herein.

The polycarbonate compositions may optionally comprise anti-drip agents. The anti-drip agent may be a fibril forming fluoropolymer such as polytetrafluoroethylene (PTFE). The anti-drip agent can be encapsulated by a rigid copolymer as described above, for example styrene-acrylonitrile copolymer (SAN). PTFE encapsulated in SAN is known as TSAN. Encapsulated fluoropolymers can be made by polymerizing the encapsulating polymer in the presence of the fluoropolymer, for example an aqueous dispersion. TSAN can provide significant advantages over PTFE, in that TSAN can be more readily dispersed in the composition. An exemplary TSAN can comprise 50 wt % PTFE and 50 wt % SAN, based on the total weight of the encapsulated fluoropolymer. The SAN can comprise, for example, 75 wt % styrene and 25 wt % acrylonitrile based on the total weight of the copolymer. Alternatively, the fluoropolymer can be preblended in some manner with a second polymer, such as for, example, an aromatic polycarbonate or SAN to form an agglomerated material for use as an anti-drip agent. Either method can be used to produce an encapsulated fluoropolymer.

The polycarbonate compositions can optionally further comprise a filler composition. The filler composition is present in an amount of 1 wt % to 20 wt % or 1 to 15 wt % based on the total weight of the polycarbonate composition. In an embodiment, the filler composition comprises titanium dioxide.

The polycarbonate compositions have excellent aesthetic properties. A molded article of the composition has reduced aesthetic defects, such as black streaking, knitline visibility, gate blush, or pearlescence compared to a molded article of a reference composition having the same siloxane loading, but containing a poly(carbonate-siloxane) copolymer comprising bisphenol A carbonate units and siloxane units wherein greater than 20 mol % of the siloxane units are directly coupled to another siloxane unit.

A molded article of the composition with a thickness of 3.2 mm thickness has a transmission higher than 50% and a haze less than 25, measured by HazeGard (ASTM D1003-00).

The polycarbonate compositions can further have good impact properties. The compositions can have an Izod notched impact energy of at least 60 $kJ/m^2$ or at least 70 $kJ/m^2$, measured at 23° C. according to ISO 180/1A using a multipurpose test specimen in accordance with ISO 3167 TYPE A. The compositions can have an Izod notched impact energy of at least 50 $kJ/m^2$ or at least 60 $kJ/m^2$, measured at –30° C. according to ISO 180/1A using a multipurpose test specimen in accordance with ISO 3167 TYPE A. The compositions can have greater than 80% ductility measured at 23 to –30° C., according to ISO 180/1A using a multipurpose test specimen in accordance with ISO 3167 TYPE A. The compositions can have an Izod notched impact energy of at least 600 J/m, at least 700 J/m or at least 800 J/m measured at +23° C., –10° C., –20° C. –30° C., –40° C., or –50° C. according to ASTM D256-10. These values can be obtained in articles having a wide range of thicknesses, for example from 0.1 to 10 mm, or 0.5 to 5 mm, or 3 mm, or 4 mm.

The polycarbonate compositions have a ductile/brittle transition temperature of less than or equal to –10° C. determined in accordance with ASTM D256-2010 on a molded part having a thickness of 3.2 mm.

A molded article of the composition passes a ball drop impact test without failure after dropping a steel ball of 500 g from a height of 500 mm after Non Conductive Vacuum Metallization (NCVM).

The polycarbonate compositions can have good chemical resistance. the composition has a tensile yield strength retention of 80% and higher after exposure of an ISO tensile bar for 24 hours to sunscreen under 0.5% strain compared to a non-exposed reference tested according to ISO 22088-3; and an elongation at break retention of 75% and higher after exposure of an ISO tensile bar for 24 hours to sunscreen under 0.5% strain compared to a non-exposed reference tested according to ISO 22088-3.

The polycarbonate compositions can further have good melt viscosities, which aid processing. The polycarbonate compositions can have a melt volume flow rate (MVR, cubic centimeter per 10 minutes (cc/10 min) of 4 to 30, greater than or equal to 5, greater than or equal to 8, greater than or equal to 10, greater than or equal to 12, greater than or equal to 14, greater than or equal to 16, greater than or equal to 18, or greater than or equal to 20, determined in accordance with ASTM D1238 under a load of 1.2 kg at 300° C. The same or similar values can be obtained in articles having a wide range of thicknesses, for example from 0.1 to 10 mm, or 0.5 to 5 mm.

The polycarbonate compositions can be manufactured by various methods known in the art. For example, powdered polycarbonate homopolymer, polycarbonate-polysiloxane copolymer and other optional components are first blended, optionally with any fillers, in a high speed mixer or by hand mixing. The blend is then fed into the throat of a twin-screw extruder via a hopper. Alternatively, at least one of the components can be incorporated into the composition by feeding it directly into the extruder at the throat and/or downstream through a sidestuffer, or by being compounded into a masterbatch with a desired polymer and fed into the extruder. The extruder is generally operated at a temperature higher than that necessary to cause the composition to flow. The extrudate can be immediately quenched in a water bath and pelletized. The pellets so prepared can be one-fourth inch long or less as desired. Such pellets can be used for subsequent molding, shaping, or forming.

Shaped, formed, casted, or molded articles comprising the polycarbonate compositions are also provided. The polycarbonate compositions can be molded into useful shaped articles by a variety of methods, such as injection molding, extrusion, rotational molding, blow molding and thermoforming. The article can be a molded article, a thermoformed article, an extruded film, an extruded sheet, a honeycomb structure, one or more layers of a multi-layer article, a substrate for a coated article, and a substrate for a metallized article.

The article is a component of a consumer electronic device selected from a gaming console, a gaming controller, a portable gaming device, a cellular telephone, a television, a personal computer, a tablet computer, a laptop computer, a personal digital assistant, a portable media player, a, a digital camera, a portable music player, an appliance, a power tool, a robot, a toy, a greeting card, a home entertainment system, and active loudspeaker, or a soundbar.

The article is an electronic housing for an adapter, a cell phone, a smart phone, a GPS device, a laptop computer, a tablet computer, an e-reader, a copier, or a solar apparatus.

The article is an automotive, scooter, and motorcycle exterior and interior component comprising panels, quarter panels, rocker panels, trim, fenders, battery covers, doors, deck-lids, trunk lids, hoods, bonnets, roofs, bumpers, fascia, grilles, mirror housings, pillar appliqués, cladding, body side moldings, wheel covers, hubcaps, door handles, spoilers, window frames, headlamp bezels, headlamps, tail lamps, tail lamp housings, tail lamp bezels, license plate enclosures, roof racks, and running boards.

The above described and other features are exemplified by the following detailed description and Examples. In the examples, unless otherwise specified, the percent (%) of the components as well as the percent (%) of siloxane are weight percent based on the sum of the weights of the bisphenol A linear polycarbonate homopolymer and the (polydimethylsiloxane)-bisphenol A polycarbonate copolymer.

EXAMPLES

Materials.

The materials used in the Examples are described in Table 1.

The "Tube" copolymers were manufactured using one or more of the tube reactor processes described in U.S. Patent Application Publication No. 2004/0039145, or the process described in U.S. Pat. No. 6,723,864, or the process described in U.S. Pat. No. 8,466,249. The "Upfront" copolymers were manufactured by introducing phosgene under interfacial reaction conditions into a mixture of bisphenol A and an eugenol terminated polydimethylsiloxane. The EE/EB ratio refers to the molar ratio of the polydiorganosiloxane subunits directly coupled to another polydiorganosiloxane submit (EE) relative to the polydiorganosiloxane subunits directly coupled to BPA subunit (EB) for the PDMS-BPA polycarbonate copolymer. The EE/EB ratio was determined via nuclear magnetic resonance spectroscopy (NMR).

TABLE 1

| Component | Chemical Description | Source |
|---|---|---|
| PC1 | Linear Bisphenol A Polycarbonate homopolymer, produced via interfacial polymerization, Mw of about 30,500 g/mol as determined by GPC using polycarbonate standards, phenol end-capped | SABIC |
| PC2 | Linear Bisphenol A Polycarbonate homopolymer, produced via interfacial polymerization, Mw of about 21,800 g/mol as determined by GPC using polycarbonate standards, para- cumylphenol (PCP) end-capped | SABIC |
| PC3 | Linear Bisphenol A Polycarbonate homopolymer, produced via interfacial polymerization, Mw of about 17,800 g/mol as determined by GPC using polycarbonate standards, para- cumylphenol (PCP) end-capped | SABIC |
| PC4 | Linear Bisphenol A Polycarbonate homopolymer, produced via interfacial polymerization, Mw of about 30,000 g/mol as determined by GPC using polycarbonate standards, para- cumylphenol (PCP) end-capped | SABIC |
| SiPC1 | PDMS (polydimethylsiloxane) - Bisphenol A Polycarbonate copolymer, produced via a tube process, 20 wt. % siloxane, average PDMS block length of 45 units (D45), Mw about 30,000 g/mol as determined by GPC using polycarbonate standards, para-cumylphenol (PCP) end-capped, EE/EB ratio of 0/100 | SABIC |
| SiPC2 | PDMS (polydimethylsiloxane) - Bisphenol A Polycarbonate copolymer, produced via a tube process, 30 wt. % siloxane, average PDMS block length of 45 units (D45), Mw about 30,000 g/mol as determined by GPC using polycarbonate standards, para-cumylphenol (PCP) end-capped, EE/EB ratio of 0/100 | SABIC |
| SiPC3 | PDMS (polydimethylsiloxane) - Bisphenol A Polycarbonate copolymer, produced via a tube process, 40 wt. % siloxane, average PDMS block length of 45 units (D45), Mw about 30,000 g/mol as determined by GPC using polycarbonate standards, para-cumylphenol (PCP) end-capped, EE/EB ratio of 0/100 | SABIC |
| SiPC4 | PDMS (polydimethylsiloxane) - Bisphenol A Polycarbonate copolymer, produced via interfacial polymerization, 20 wt. % siloxane, average PDMS block length of 45 units (D45), Mw about 30,000 g/mol as determined by GPC using polycarbonate standards, para-cumylphenol (PCP) end-capped, EE/EB ratio of 38/62 | SABIC |
| SiPC5 | PDMS (polydimethylsiloxane) - Bisphenol A Polycarbonate copolymer, produced via interfacial polymerization, 6 wt. % siloxane, average PDMS block length of 45 units (D45), Mw about 23,000 g/mol as determined by GPC using polycarbonate standards, para-cumylphenol (PCP) end-capped, EE/EB ratio of 0/100 | SABIC |
| I-168 | Tris(2,4-ditert-butylphenyl)phosphite (IRGAFOS-168) | Ciba |

The additive composition that was used in the Examples contains 0.03-0.06% Irgafos 168 (as indicated in the Tables), and where indicated a grey, white or black color package.

Blending, Extrusion, and Molding Conditions

The compositions were prepared by pre-blending all constituents in a dry-blend and tumble mixed for 15 minutes. The pre-blend was fed directly to a co-rotation twin screw extruder under the conditions shown in Table 2. The extrudate was pelletized and dried in a dehumidifying dryer at about 120° C. for about 3 hours. To make test specimens, the dried pellets were injection molded in an ENGEL molding machine to form appropriate test samples under the conditions shown in Table 2.

TABLE 2

| Compounding Machine: Werner-Pfleiderer ZSK twin-screw extruder (25 mm) | | | Injection Molding Machine: Engel E45, E75 or E90 | | |
|---|---|---|---|---|---|
| Feed (zone 0) Temperature | ° C. | 40 | Pre-dry Time | h | 2 |
| Zone 1 Temperature | ° C. | 200 | Pre-dry Temperature | ° C. | 120 |
| Zone 2 Temperature | ° C. | 250 | Hopper Temperature | ° C. | 40 |
| Zone 3 Temperature | ° C. | 270 | Zone 1 Temperature | ° C. | 280 |
| Zones 4-9 Temperature | ° C. | 285 | Zone 2 Temperature | ° C. | 290 |
| Screw Speed | rpm | 300 | Zone 3 Temperature | ° C. | 300 |
| Throughput | kg/h | 18-24 | Nozzle Temperature | ° C. | 295 |
| Torque | % | 50-70 | Mold Temperature | ° C. | 90 |
| Vacuum 1 | bar | 0.7 | Cycle Time | s | ±37 |

Testing Methods.

Tensile properties were measured in accordance to ISO 527 at 50 mm/min at room temperature on standard ISO tensile bars.

Notched Izod impact Strength ('INI') was determined in accordance with ASTM D256-10 under a load of 5 lbf and in accordance with ISO 180 under a load of 5.5 J, at different temperatures including a temperature of 23° C., −20° C., −30° C., −40° C., or −50° C. All ASTM INI determinations were carried out on sample plaques of 3.2 mm thickness, whereas ISO NI determinations were carried out on sample plaques of 3 mm thickness.

INI ductile/brittle transition temperature (D/B transition temperature) was determined according to ASTM D256-10 or ISO 180 by measuring impact properties at various temperatures to identify the temperature at which brittle fracture is first observed. A lower D/B transition temperature is better.

Melt volume rate ("MVR") was determined in accordance with ASTM D1238 under a load of 1.2 kg at 300° C.

Haze and transmission measurement by HazeGard (ASTM D1003-00) used injection molded samples of 3.2 mm thickness.

Pearlescence was determined by visual inspection. Three parts per sample were randomly compared by 3 operators to 4 reference materials representing a range from excellent performance (no pearlescence) with rating 1 to highly pearlescent with rating 7, with 2 intermediate references with ratings 3 and 5. References were selected by 3 experienced operators and fixed for all analysis on pearlescence. Each part was compared to each of the 4 references separately and was rated to be better, worse or equal to each reference. Based on this assessment, a rating ranging from 1 to 7 was given for each part and the overall rating is the average of all measurements by all operators.

Gate blush was evaluated using a molded mobile phone part (e.g. see FIG. 1) with 1.0 mm thickness and one gate with a 1.4 mm diameter. The part was molded under different processing conditions and area around the gate was evaluated for each processing condition, and the number of samples that showed gate blush were counted.

Environmental Stress Cracking Resistance ("ESCR") describes the accelerated failure of polymeric materials, as a combined effect of environment, temperature and stress. The failure mainly depends on the characteristics of the material, chemical, exposure condition and the magnitude of the stress. The tests followed ISO 22088-3 standard and used ISO tensile bars under 0.5% or 1% strain for 24 hours at room temperature with chemical (BANABA BOAT sunscreen) applied on the surface. After 24 hours, the retention of tensile strength and elongation to break, measured according to ISO 527, compared to the non-exposed reference.

Non Conductive Vacuum Metallization ("NCVM") was conducted per typical industry standard methods. NCVM means applying a metallic coating material over an article in a vacuum chamber. The coating material that is being applied is then heated until it starts to evaporate. This vaporized metal condenses on the article as a thin metallic film creating uniformity in the coat.

Ball drop tests were performed on mobile phone parts before and after NCVM in the center part and the corners. A steel ball of 500 g was dropped onto the mobile phone part from a testing height of 500 mm, and the number of samples that broke are counted.

Aesthetics for Different SiPC/PC Blends

The aesthetic properties of blends of PC with different SiPC copolymers, with variations in EE/EB ratio and siloxane content (6-40%) are compared in Tables 3.

TABLE 3*

| Component | Ex1 | CEx2 | CEx3 | CEx4 | CEx5 |
|---|---|---|---|---|---|
| PC1 (%) | 37.5 | 43.33 | 46.25 | 37.5 | 32 |
| PC2 (%) | 44.97 | 44.97 | 44.97 | 44.97 | 10 |
| SiPC1 (%) | 17.50 | | | | |
| SiPC2 (%) | | 11.67 | | | |
| SiPC3 (%) | | | 8.75 | | |
| SiPC4 (%) | | | | 17.50 | |
| SiPC5 (%) | | | | | 58 |
| Additives (%) | 0.03 | 0.03 | 0.03 | 0.03 | 0.06 |
| Formulation Total | 100.00 | 100.00 | 100.00 | 100.00 | 100.00 |
| Siloxane % | 3.5 | 3.5 | 3.5 | 3.5 | 3.5 |
| INI @ 23° C. (kJ/m$^2$), ISO 180 | 70.8 | 62.7 | 66.5 | 67.1 | 65 |
| Ductility @ 23° C., ISO 180 | 100 | 100 | 100 | 100 | 100 |
| INI @ −30° C. (kJ/m$^2$), ISO 180 | 61.5 | 55.4 | 57.5 | 58.1 | 53 |
| Ductility@ −30° C., ISO 180 | 100 | 100 | 100 | 100 | 100 |
| MVR (cm$^3$/10 min) | 8 | 10 | 9 | 10 | 10 |
| Pearlescence | 2 | 7 | 7 | 7 | 1 |

*The percent (%) in Table 3 is weight percent, based on the total weight of the formulation.

Table 3 indicates the effect of both the EE/EB ratio as well as the siloxane loading in the SiPC copolymer on the overall properties of blends of SiPC with polycarbonate at similar siloxane loadings in the composition.

CEx4 shows that a SiPC4/PC blend with 3.5% siloxane containing SiPC4 with 20% siloxane made via upfront process having a EE/EB molar ratio of 38/62 has high levels of pearlescence (value of 7). As demonstrated in FIG. 2, the siloxane domains are relatively large (typically 20-50 nm), due to using the upfront process and the high EE/EB ratio, typically resulting in relatively 'blocky' SiPC copolymer, which acts as efficient impact modifier, but causes relatively poor aesthetics.

CEx5 shows that a SiPC5/PC blend with 3.75% siloxane containing SiPC5 with 6% siloxane made via tubular process and having a EE/EB molar ratio of 0/100 has much better aesthetic properties, and demonstrates no appearance of pearlescence (value of 1). As demonstrated in FIG. 2, the siloxane domains are relatively small (typically below 20 nm), due to using the tubular process and low EE/EB molar ratio, typically resulting in relatively random SiPC copolymer, which acts as less efficient impact modifier, but has good aesthetics.

An improvement in aesthetic properties for 20% siloxane containing PC can be achieved via using the tubular process (SiPC1) instead of the upfront process (SiPC4). Ex1 shows that a SiPC1/PC blend with 3.5% siloxane made via tubular process and having a EE/EB molar ratio of 0/100 has much better aesthetic properties than CEx4, with pearlescence rating of 2, close to CEx5. As demonstrated in FIG. 2, the siloxane domains are relatively small (ca. 20 nm), due to using the tubular process and low EE/EB molar ratio, typically resulting in relatively random SiPC copolymer, which has relatively good aesthetics, and still has good impact properties.

Figure 2:
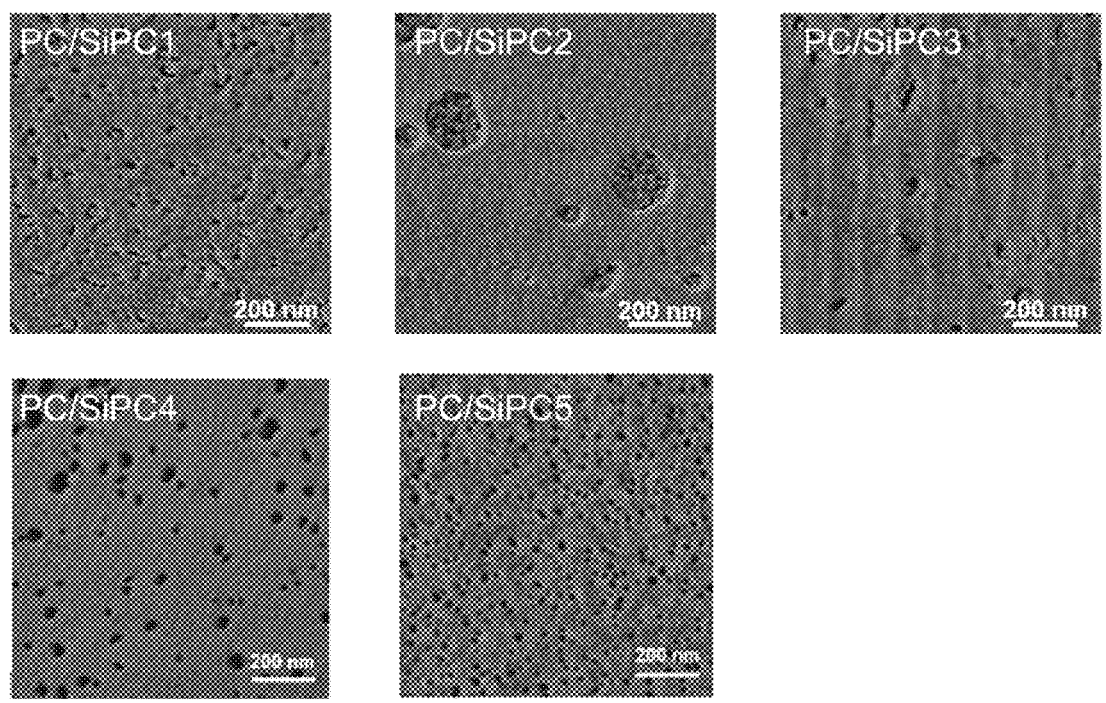
FIG. 2 shows AFM scanning images of blends of PC with different types of SiPC, namely SiPC1, SiPC2, SiPC3, SiPC4 and SiPC5 at similar siloxane loadings.

Further increasing the siloxane % in the SiPC copolymer made via tubular process to 30% (SiPC2) or 40% (SiPC3) does not result in equally good aesthetic properties. CEx2 and CEx3 shows that SiPC2/PC and SiPC3/PC blends with 3.5% siloxane made via tubular process have very poor aesthetic properties, with high pearlescence values of 7, despite using the tubular process and generating random SiPC copolymers with EE/EB ratio of 0/100. The explanation for this can be found in the morphology, as shown in FIG. 2. In the case of blends with SiPC2 and SiPC3 with PC, the siloxane domains are very large (as large as 100-200 nm). Despite the highly random copolymer, the domain sizes are large, which suggests that the SiPC copolymer with high siloxane loadings are not well miscible with PC homopolymer and as such, have relatively poor aesthetics.

In conclusion, the results shown that blends of SiPC copolymer and PC can be formulated to have good aesthetics, but that both the process (tubular process), which affects the EE/EB ratio, and the siloxane content (10-30%) need to be optimized to achieve the proper balance of properties.

Impact and Flow Properties

The impact and flow properties of exemplary compositions of the present disclosure and comparative compositions are shown in Tables 4 and 5.

Table 4 compares blends of PC and SiPC copolymer with 20% siloxane made via upfront (SiPC4) and tubular process (SiPC1) at high flow levels (MVR of 15-20). The contents of the different PC types were adjusted such to achieve this MVR target.

TABLE 4

| Component | Ex6 | Ex7 | Ex8 | Ex9 | CEx10 | CEx11 | CEx12 | CEx13 | CEx14 |
|---|---|---|---|---|---|---|---|---|---|
| PC2 (%) | 77.5 | 87 | 50 | 20 | 68.5 | 69 | 69.5 | 70 | 67.5 |
| PC3 (%) | | | 32.5 | 57.5 | | | | | |
| PC4 (%) | 17.5 | 3 | | | 26.5 | 21 | 13 | 7.5 | 32.5 |
| SiPC4 (%) | 0 | 0 | 0 | 0 | 5 | 10 | 17.5 | 22.5 | 0 |
| SiPC1 (%) | 5 | 10 | 17.5 | 22.5 | 0 | 0 | 0 | 0 | 0 |
| Additives (%) | 0.06 | 0.06 | 0.06 | 0.06 | 0.06 | 0.06 | 0.06 | 0.06 | 0.06 |
| Siloxane % | 1 | 2 | 3.5 | 4.5 | 1 | 2 | 3.5 | 4.5 | 0 |
| ASTM INI @-20° C. (J/m) | 748 | 732 | 743 | 681 | 681 | 760 | 749 | 722 | 152 |
| Ductility@-20° C. (%) | 80 | 100 | 100 | 100 | 80 | 100 | 100 | 100 | 0 |
| ASTM INI @-30° C. (J/m) | 270 | 723 | 707 | 678 | 240 | 716 | 724 | 724 | 126 |
| Ductility@-30° C. (%) | 0 | 40 | 100 | 100 | 0 | 100 | 100 | 100 | 0 |
| ASTM INI @-40° C. (J/m) | 252 | 647 | 683 | 666 | 207 | 387 | 694 | 667 | 118 |
| Ductility @-40° C. (%) | 0 | 0 | 100 | 100 | 0 | 0 | 100 | 100 | 0 |
| ASTM D/B transition temp. (° C.) | -10 | -20 | -40 | -40 | -10 | -20 | -40 | -40 | 23 |
| MVR (cm$^3$/10 min) | 17.4 | 18.7 | 18.5 | 17.6 | 16.3 | 15.7 | 16.4 | 19.2 | 16.5 |
| T%@3.2 mm | 76.6 | 67.3 | 61.7 | 62.4 | 42.4 | 34.2 | 27.6 | 24.1 | 89.4 |
| H%@3.2 mm | 6.8 | 15.9 | 25.3 | 24.3 | 85.6 | 95.8 | 96 | 96 | 1.4 |

Examples 6 to 9 show that SiPC1/PC blends have similar flow (MVR of 15-19) and similar low temperature impact properties (D/B transition temperature) as SiPC4/PC blends with same siloxane loading (CEx10 to CEx13). However, as shown before, SiPC4/PC blends have poor aesthetics, as it is made via upfront process having an EE/EB molar ratio of 38/62.

Compared to PC homopolymer compositions of similar flow level (CEx14), SiPC1/PC blends have superior impact performance even with only 5% SiPC1 in the composition, having 80% ductility at −20° C. (Ex6) compared to 0% ductility for PC (CEx14), and having further improved impact at higher SiPC1 loadings.

SiPC1/PC blends have much higher transmission and lower haze compared to SiPC4/PC blends at similar siloxane loading, which is typically indicating improved aesthetic properties, such as pearlescence or gate blush. This is related to SiPC1 having an EE/EB molar ratio of 0/100 and being made via the tubular process, whereas SiPC4 has an EE/EB molar ratio of 38/62.

These results demonstrate that SiPC1/PC blends can be formulated to have excellent balance of low temperature impact and flow properties, in combination with good aesthetics, and have a better balance of aesthetics and impact properties compared to SiPC4/PC blends with similar siloxane loadings and flow.

Table 5 compares blends of PC and SiPC copolymers with 20% siloxane made via upfront (SiPC4) and tubular process (SiPC1) at intermediate flow levels (MVR of 7-10). The contents of the different PC types were adjusted such to achieve this MVR target.

TABLE 5

| Component | Ex15 | Ex16 | Ex17 | Ex18 | CEx19 |
|---|---|---|---|---|---|
| PC4 (%) | 60 | 45 | 35 | 25 | 37.5 |
| PC2 (%) | 35 | 45 | 47.5 | 50 | 45 |
| SiPC4 (%) | 0 | 0 | 0 | 0 | 17.5 |
| SiPC1 (%) | 5 | 10 | 17.5 | 25 | 0 |
| Additives (%) | 0.03 | 0.03 | 0.03 | 0.03 | 0.03 |

TABLE 5-continued

| Component | Ex15 | Ex16 | Ex17 | Ex18 | CEx19 |
|---|---|---|---|---|---|
| Siloxane % | 1 | 2 | 3.5 | 5 | 3.5 |
| ASTM INI @ 23° C. (J/m) | 917 | 955 | 971 | 922 | 911 |
| Ductility @ 23° C. (%) | 100 | 100 | 100 | 100 | 100 |
| ASTM INI @−20° C. (J/m) | 868 | 889 | 894 | 858 | 864 |
| Ductility@−20° C. (%) | 100 | 100 | 100 | 100 | 100 |
| ASTM INI @−30° C. (J/m) | 848 | 848 | 854 | 822 | 812 |
| Ductility@−30° C. (%) | 100 | 100 | 100 | 100 | 100 |
| ASTM INI @−40° C. (J/m) | 396 | 822 | 845 | 833 | 802 |
| Ductility @−40° C. (%) | 20 | 80 | 100 | 100 | 100 |
| ASTM D/B transition temperature (° C.) | −30 | −30 | −40 | −40 | −40 |
| MVR (cm³/10 min) | 8.96 | 9.06 | 8.25 | 7.06 | 10.6 |

Examples 15 to 18 show that SiPC1/PC blends have excellent low temperature impact properties, even at low SiPC1 loading, with D/B transitions of −30 or even −40° C. At the same siloxane loading, SiPC1/PC blends perform similarly to SiPC4/PC blends (Ex17 compared to CEx19).

These results demonstrate that SiPC1/PC blends can be formulated to have excellent balance of low temperature impact and flow properties, in combination with good aesthetics, as previously shown, and have a better balance of aesthetics and impact properties compared to SiPC4/PC blends with similar siloxane loadings and flow.

Chemical Resistance

Chemical resistance properties of exemplary compositions of the present disclosure and comparative compositions are shown in Table 6. The contents of the different PC types were adjusted such to achieve an MVR target of 7-9.

TABLE 6

| Component | Ex17 | Ex20 | Ex21 | Ex18 | CEx22 | CEx23 |
|---|---|---|---|---|---|---|
| PC2 (%) | 47.5 | 48 | 50 | 50 | 6 | 45 |
| PC4 (%) | 35 | 37 | 30 | 25 | 11 | 37.5 |
| SiPC4 (%) | 0 | 0 | 0 | 0 | 0 | 17.5 |
| SiPC5 (%) | 0 | 0 | 0 | 0 | 83 | 0 |
| SiPC1 (%) | 17.5 | 15 | 20 | 25 | 0 | 0 |
| Additives (%) | 0.03 | 0.03 | 0.03 | 0.03 | 0.06 | 0.03 |
| Siloxane (%) | 3.5 | 3 | 4 | 5 | 4.98 | 3.5 |
| MVR (cm³/10 min) | 8.25 | 8.74 | 8.1 | 7.06 | 9 | 9 |

TABLE 6-continued

| Component | Ex17 | Ex20 | Ex21 | Ex18 | CEx22 | CEx23 |
|---|---|---|---|---|---|---|
| Sunscreen, 0.5% strain, % tensile strength | 85 | 102 | 92 | 103 | 0 | 98 |
| Sunscreen, 0.5% strain, % elongation @break | 76 | 106 | 95 | 101 | 0 | 104 |

The results in Table 6 show that SiPC1/PC blends have good retention of tensile strength and elongation to break after exposure to Banana Boat SPF30 sunscreen at 0.5% strain for 24 hours, with values higher than 75% for SiPC1 loadings between 15 and 25% (Ex17, Ex20, Ex21 and Ex18). This is similar to SiPC4/PC blends at same siloxane loading (CEx23 compared to Ex17) and significantly better than blends of SiPC5/PC (CEx23), which have no retention of tensile properties. As shown before, SiPC4/PC blends have poor aesthetic properties with significant pearlescence (CEx4) and low transmission (CEx12), whereas SiPC1/PC and SiPC5/PC blends have low to no pearlescence.

In conclusion, SiPC1/PC blends have good balance of chemical resistance to sunscreen and aesthetics compared to SiPC4/PC blends (same chemical resistance, but poor aesthetics) or SiPC5/PC blends (good aesthetics, but poor chemical resistance).

Mobile Phone Part Molding

Table 7 shows the occurrence of gate blush and the impact performance after metallization for exemplary compositions of the present disclosure and comparative compositions. The contents of the different PC types were adjusted such to achieve an MVR target of 10 or 15.

TABLE 7

| Component | Ex24 | CEx25 | CEx26 | Ex27 | CEx28 | CEx29 |
|---|---|---|---|---|---|---|
| PC2 (%) | 45 | 55 | 14 | 45 | 55 | 14 |
| PC4 (%) | 37.5 | 27.5 | 28 | 37.5 | 27.5 | 28 |
| SiPC4 (%) | 0 | 17.5 | 0 | 0 | 17.5 | 0 |
| SiPC5 (%) | 0 | 0 | 58 | 0 | 0 | 58 |
| SiPC1 (%) | 17.5 | 0 | 0 | 17.5 | 0 | 0 |
| Additives (%) | 0.03 | 0.03 | 0.46 | 0.03 | 0.03 | 0.46 |
| Siloxane % | 3.5 | 3.5 | 3.48 | 3.5 | 3.5 | 3.48 |
| Color | White | White | White | Grey | Grey | Grey |
| MVR (cm³/10 min) | 15 | 15 | 10 | 15 | 15 | 10 |
| Ball drop impact (pass/tested) Center | | | | | | |
| As molded | 0/3 | 0/3 | 0/3 | 0/3 | 0/3 | 0/3 |
| With NCVM | 0/3 | 0/3 | 0/3 | 0/3 | 0/3 | 0/3 |
| Corner | | | | | | |
| As molded | 0/3 | 0/3 | 0/3 | 0/3 | 0/3 | 0/3 |
| With NCVM | 0/3 | 0/3 | 0/3 | 0/3 | 0/3 | 3/3 |
| Gate blush (gate blush/tested) | | | | | | |

TABLE 7-continued

| Component | Ex24 | CEx25 | CEx26 | Ex27 | CEx28 | CEx29 |
|---|---|---|---|---|---|---|
| Injection speed: 22 mm/sec, Estimated shear rate at gate: 30000/sec | | | | | | |
| 300° C. | 0/5 | 4/5 | 0/5 | 0/5 | 1/5 | 0/5 |
| 320° C. | 0/5 | 2/5 | 0/5 | 0/5 | 0/5 | 0/5 |
| 340° C. | 0/5 | 0/5 | 0/5 | 0/5 | 0/5 | 0/5 |
| Injection speed: 43 mm/sec, Estimated shear rate at gate: 60000/sec | | | | | | |
| 300° C. | 0/5 | 4/5 | 0/5 | 0/5 | 4/5 | 0/5 |
| 320° C. | 0/5 | 4/5 | 0/5 | 0/5 | 3/5 | 0/5 |
| 340° C. | 0/5 | 0/5 | 0/5 | 0/5 | 0/5 | 0/5 |
| Injection speed: 86 mm/sec, Estimated shear rate at gate: 120000/sec | | | | | | |
| 300° C. | 0/5 | 5/5 | 0/5 | 0/5 | 5/5 | 0/5 |
| 320° C. | 0/5 | 5/5 | 0/5 | 0/5 | 4/5 | 0/5 |
| 340° C. | 0/5 | 5/5 | 0/5 | 0/5 | 2/5 | 0/5 |
| Injection speed: 155 mm/sec, Estimated shear rate at gate: 200000/sec | | | | | | |
| 300° C. | 0/5 | 5/5 | 0/5 | 0/5 | 5/5 | 0/5 |
| 320° C. | 0/5 | 5/5 | 0/5 | 0/5 | 5/5 | 0/5 |
| 340° C. | 0/5 | 5/5 | 0/5 | 0/5 | 4/5 | 0/5 |

These examples demonstrate the performance of the SiPC1/PC blends in typical mobile phone testing. Mobile phones were molded and tested under various conditions, namely melt temperature (300, 320 or 340° C.) and injection speed (22 to 155 mm/s), the latter resulting in different shear rates at the gate. Ball drop impact performance was measured before and after Non Conductive Vacuum Metallization (NCVM) in the center and at a corner. For gate blush, the data represents the number of parts showing gate blush/total number of parts. For ball drop test, the data represents the number of parts failing ball drop test/total number of parts.

Results show that there are significant gate blush issues for white colored and grey colored samples containing SiPC4 (20% siloxane, produced via upfront process, EE/EB molar ratio 38/62) and PC (CEx25 and CEx28) under most conditions varied in melt temperature and injection speed, especially at high injection speeds. On the other hand, blends of PC with SiPC1 (20% siloxane, produced via tubular process, EE/EB molar ratio 0/100) (Ex24 and Ex27) or SiPC5 (6% siloxane, produced via tubular process, EE/EB molar ratio 0/100) (CEx26 and CEx29) do not have gate blush under any of the evaluated conditions. This demonstrates the superior aesthetic performance of SiPC1/PC and SiPC5/PC blends over SiPC4/PC blends.

The ball drop test data show that all parts pass the test in all locations for white colored SiPC1/PC, SiPC4/PC and SiPC5/PC blends, both before and after metallization. However, in the case of grey color, significant differences can be observed for SiPC5/PC blends, which have failures (3/3 in corner), whereas all SiPC1/PC and SiPC4/PC blends pass tests. This shows that blends containing SiPC1 or SiPC4 have superior impact retention after NCVM metallization compared to SiPC5 at same siloxane loadings, despite the lower MVR of SiPC5/PC blend (which is typically beneficial for impact performance).

These results show that SiPC1/PC blends have a superior balance of aesthetics (no gate blush) and impact retention after metallization compared to SiPC4/PC (good impact retention, but gate blush issues) and SiPC5/PC (no gate blush, but loss of impact after metallization) blends at same siloxane loadings in the composition.

Aesthetics and Chemical Resistance

Table 8 shows the occurrence of pearlescence and the property retention after exposure to sunscreen for exemplary compositions of the present disclosure.

TABLE 8

| Component | Ex30 | Ex31 | Ex32 | Ex33 | CEx40 | CEx45 |
|---|---|---|---|---|---|---|
| PC1 (%) | 40.9 | 31.8 | 22.7 | 13.6 | 32 | 37.5 |
| PC2 (%) | 49.1 | 38.2 | 27.3 | 16.4 | 10 | 45 |
| SiPC4 (%) | 0 | 0 | 0 | 0 | 0 | 17.5 |
| SiPC5 (%) | 0 | 0 | 0 | 0 | 58 | 0 |
| SiPC1 (%) | 10 | 30 | 50 | 70 | 0 | 0 |
| Additives (%) Color | 0.621 | 0.621 | 0.621 | 0.621 | 0.621 | 0.621 |
| Siloxane % | 2 | 6 | 10 | 14 | 3.5 | 3.5 |
| MVR | 3.43 | 2.62 | 2.56 | 1.67 | 10 | 10 |
| Pearlescence | 1 | 1.75 | 1.5 | 2.25 | 1 | 7 |
| Sunscreen, 0.5% strain, % tensile strength | 100 | 101 | 101 | 103 | 0 | 100 |
| Sunscreen, 0.5% strain, % elongation @break | 85 | 90 | 100 | 109 | 0 | 97 |
| Sunscreen, 1% strain, % tensile strength | 40 | 100 | 100 | 98 | 0 | 100 |
| Sunscreen, 1% strain, % elongation @break | 43 | 84 | 100 | 72 | 0 | 102 |

CEx45 shows that blends of SiPC4 (SiPC made via upfront process and with 20% siloxane and EE/EB molar ratio of 38/62) and PC have, at siloxane loading of 3.5%, extremely poor results in the pearlescence test with pearlescence value of 7 (which is the maximum value), indicating that samples containing polycarbonate and SiPC4 have poor aesthetic performance.

CEx40 shows that blends of SiPC5 (SiPC made via tubular process and with 6% siloxane and EE/EB molar ratio of 0/100) and PC have, at siloxane loading of 3.5%, excellent pearlescence properties with pearlescence value and has the best possible ranking of 1, similar to pure PC compositions.

Examples 30 to 33 show that blends of SiPC1 (SiPC made via tubular process and with 20% siloxane and EE/EB ratio of 0/100) and PC have excellent pearlescence properties at various blend ratios. Up to siloxane loadings of 10%, the best possible ranking is achieved similar to SiPC5, whereas at higher siloxane loadings, pearlescence performance deteriorates somewhat with a ranking of 2.25, but still far outperforming SiPC4, with contents of SiPC1 ranging from 10 to 70%. This demonstrates that good aesthetics can be obtained with blends of SiPC1 and PC at a broad variety of SiPC1 contents, up to 70% of SiPC, which allows optimizing the blend composition for other properties, such as impact and flow properties.

Furthermore, Examples 30 to 33 also have good retention of tensile strength and elongation to break after exposure to Bananaboat sunscreen at 0.5% (Ex30) and even 1% strain (Ex31-33), comparable to CEx45, which is based on blend of PC and SiPC4 (20D45 SiPC made via upfront process with EE/EB of 38/62) and outperforming CEx40, which is blend of SiPC5 and PC (6D45 SiPC made via tubular process).

These results show that SiPC1/PC blends have a superior balance of aesthetics (low pearlescence) and chemical resistance to sunscreen compared to SiPC4/PC (good chemical resistance, but significant pearlescence) and SiPC5/PC (no pearlescence, but poor chemical resistance) blends at same siloxane loadings in the composition.

Further included in this disclosure are the following specific embodiments, which do not necessarily limit the claims.

Embodiment 1

A polycarbonate composition comprising:
30 to 95 wt % of one or more bisphenol A polycarbonate homopolymers; and
5 to 70 wt % of a poly(carbonate-siloxane) copolymer with a siloxane content of 10 wt. % to 25 wt. % based on the total weight of the poly(carbonate-siloxane), in an amount effective to provide a total siloxane content of 0.5 wt. % to 17.5 wt. % based on the total weight of the composition;
the poly(carbonate-siloxane) copolymer
comprising bisphenol carbonate units of the formula

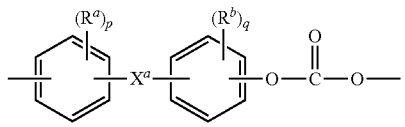

wherein
$R^a$ and $R^b$ are each independently $C_{1-12}$ alkyl, $C_{1-12}$ alkenyl, $C_{3-8}$ cycloalkyl, or $C_{1-12}$ alkoxy,
p and q are each independently 0 to 4, and
$X^a$ is a single bond, —O—, —S—, —S(O)—, —S(O)$_2$—, —C(O)—, a $C_{1-11}$ alkylidene of formula —C($R^c$)($R^d$)— wherein $R^c$ and $R^d$ are each independently hydrogen or $C_{1-10}$ alkyl, or a group of the formula —C(=$R^e$)— wherein $R^e$ is a divalent $C_{1-10}$ hydrocarbon group; and
siloxane units of the formulas

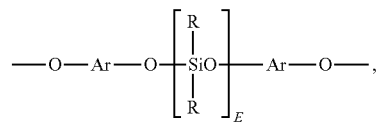

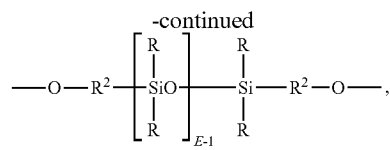

or a combination comprising at least one of the foregoing, wherein
R is each independently a $C_{1-13}$ monovalent hydrocarbon group,
Ar is each independently a $C_{6-30}$ aromatic group,
$R^2$ is each independently a $C_{2-8}$ alkylene group, and
E has an average value of 10 to 100, preferably 20 to 60, more preferably 30 to 50;
wherein in the poly(carbonate-siloxane) copolymer less than 0.5 mol % of the siloxane units are directly coupled to another siloxane units; and further
wherein the composition has a tensile yield strength retention of 80% and higher after exposure of an ISO tensile bar for 24 hours to sunscreen under 0.5% strain compared to a non-exposed reference tested according to ISO 22088-3; and
an elongation at break retention of 75% and higher after exposure of an ISO tensile bar for 24 hours to sunscreen under 0.5% strain compared to a non-exposed reference tested according to ISO 22088-3.

Embodiment 2

The composition of Embodiment 1 wherein the composition has a melt volume rate ("MVR"), determined in accordance with ASTM D1238 under a load of 1.2 kg at 300° C., higher than 5 and a ductile/brittle transition temperature of less than or equal to −10° C. determined in accordance with ASTM D256-2010 on a molded part having a thickness of 3.2 mm.

Embodiment 3

The composition of Embodiment 1 or Embodiment 2 further comprising a colorant composition,
wherein
a molded sample having a thickness of 1 mm formed from the composition has an average L* value of 29 or less as measure by the CIE Lab method, 10 degree observer, D65 illuminant, specular component included, measured in reflectance mode.

Embodiment 4

The composition of any one or more of Embodiments 1 to 3, wherein a molded article of the composition has reduced aesthetic defects comprising one or more of the following: black streaking; knitline visibility; gate blush; or pearlescence compared to a molded article of a reference composition having the same siloxane loading, but containing a poly(carbonate-siloxane) copolymer comprising bisphenol A carbonate units and siloxane units wherein greater than 20 mol % of the siloxane units are directly coupled to another siloxane unit.

Embodiment 5

The composition of any one or more of Embodiments 1 to 4, wherein a molded article of the composition passes a ball drop impact test without failure after dropping a steel ball of 500 g from a height of 500 mm after Non Conductive Vacuum Metallization (NCVM).

Embodiment 6

The composition of any one or more of Embodiments 1 to 5, wherein a molded article of the composition with a thickness of 3.2 mm thickness has a transmission higher than 50% and a haze less than 25%, measured by HazeGard (ASTM D1003-00).

Embodiment 7

The composition of any one or more of Embodiments 1 to 6, wherein the bisphenol carbonate units of the poly(carbonate-siloxane) are bisphenol A carbonate units and siloxane units of the poly(carbonate-siloxane) are of the formula

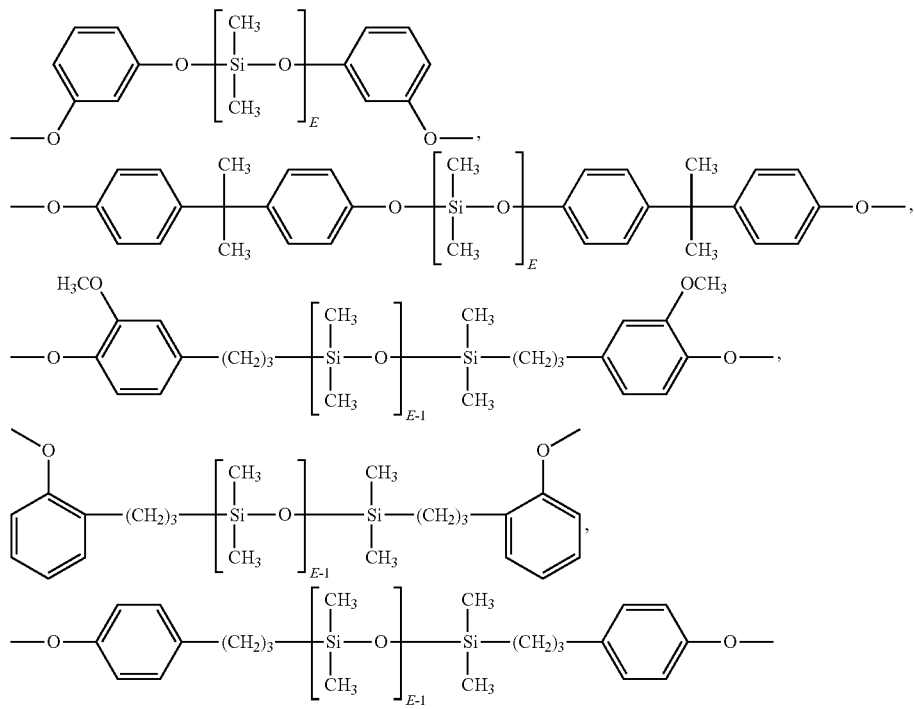

or a combination comprising at least one of the foregoing, wherein E has an average value of 10 to 100, preferably 20 to 60, more preferably 30 to 50. The composition of any one or more of claims 1 to 7, wherein the poly(carbonate-siloxane) is present in an amount of 5 to 40 wt. % based on the sum of the weights of the bisphenol A polycarbonate homopolymer and the poly(carbonate-siloxane).

Embodiment 8

The composition of any one or more of Embodiments 1 to 7, wherein the poly(carbonate-siloxane) is present in an amount of 10 to 30 wt. % based on the sum of the weights of the bisphenol A polycarbonate homopolymer and the poly(carbonate-siloxane).

Embodiment 9

The composition of any one or more of claims 3 to 8 wherein the colorant composition comprises carbon black in an amount of greater than zero and less than 1.5 wt. % based on the total weight of the colorant composition.

Embodiment 10

The composition of any one or more of Embodiments 1 to 9, further comprising a filler composition.

Embodiment 11

The compositions of Embodiment 10, wherein the filler composition comprises $TiO_2$.

Embodiment 12

The composition of Embodiment 10 or Embodiment 11, wherein the filler composition is present in an amount from 1 wt % to 20 wt % based on the total weight of the polycarbonate composition.

Embodiment 13

The composition of any one or more of Embodiments 1 to 12, further comprising a flame retardant, an anti-drip agent, or a combination comprising at least one of the foregoing, wherein optionally the flame retardant comprising an alkali metal salt of a perfluorinated $C_1$-$C_{16}$ alkyl sulfonate, an inorganic acid complex salt, or a combination comprising at least one of the foregoing.

Embodiment 14

The composition of any one or more of Embodiments 1 to 13 further comprising no more than 5 wt. % based on the weight of the composition of a processing aid, a heat stabilizer, an antioxidant, an ultra violet light absorber, or a combination comprising at least one of the foregoing.

Embodiment 15

An article selected from a molded article, a thermoformed article, an extruded film, an extruded sheet, a honeycomb structure, one or more layers of a multi-layer article, a substrate for a coated article, and a substrate for a metallized article made from the composition of any one or more of Embodiments 1 to 14.

Embodiment 16

The article of Embodiment 15 wherein the article is a component of a consumer electronic device selected from a gaming console, a gaming controller, a portable gaming device, a cellular telephone, a television, a personal computer, a tablet computer, a laptop computer, a personal digital assistant, a portable media player, a digital camera, a portable music player, an appliance, a power tool, a robot, a toy, a greeting card, a home entertainment system, and active loudspeaker, or a soundbar, or the article is an electronic housing for an adapter, a cell phone, a smart phone, a GPS device, a laptop computer, a tablet computer, an e-reader, a copier, or a solar apparatus, or the article is an electrical junction box, an electrical connector, an electrical vehicle charger, an outdoor electrical enclosure, a smart meter enclosure, a smart grid power node, a photovoltaic frame, a miniature circuit breaker, or the article is an automotive, scooter, and motorcycle exterior and interior component comprising panels, quarter panels, rocker panels, trim, fenders, battery covers, doors, deck-lids, trunk lids, hoods, bonnets, roofs, bumpers, fascia, grilles, mirror housings, pillar appliqués, cladding, body side moldings, wheel covers, hubcaps, door handles, spoilers, window frames, headlamp bezels, headlamps, tail lamps, tail lamp housings, tail lamp bezels, license plate enclosures, roof racks, and running boards.

Embodiment 17

In A method of manufacture of an article, comprising molding, extruding, casting, or shaping the composition of any one or more of Embodiments 1 to 14 to form the article.

The singular forms "a," "an," and "the" include plural referents unless the context clearly dictates otherwise. "Or" means "and/or" unless clearly indicated otherwise by context. Unless defined otherwise, technical and scientific terms used herein have the same meaning as is commonly understood by one of skill in the art to which this invention belongs. A "combination" is inclusive of blends, mixtures, alloys, reaction products, and the like.

As used herein, the term "hydrocarbyl" and "hydrocarbon" refers broadly to a substituent comprising carbon and hydrogen, optionally with 1 to 3 heteroatoms, for example, oxygen, nitrogen, halogen, silicon, sulfur, or a combination thereof; "alkyl" refers to a straight or branched chain, saturated monovalent hydrocarbon group; "alkylene" refers to a straight or branched chain, saturated, divalent hydrocarbon group; "alkylidene" refers to a straight or branched chain, saturated divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicyclic hydrocarbon group having at least three carbon atoms, "cycloalkenyl" refers to a non-aromatic cyclic divalent hydrocarbon group having at least three carbon atoms, with at least one degree of unsaturation; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—).

Unless otherwise indicated, each of the foregoing groups can be unsubstituted or substituted, provided that the substitution does not significantly adversely affect synthesis, stability, or use of the compound. The term "substituted" as used herein means that at least one hydrogen on the designated atom or group is replaced with another group, provided that the designated atom's normal valence is not exceeded. When the substituent is oxo (i.e., =O), then two hydrogens on the atom are replaced. Combinations of substituents and/or variables are permissible provided that the substitutions do not significantly adversely affect synthesis or use of the compound. Exemplary groups that can be present on a "substituted" position include, but are not limited to, cyano; hydroxyl; nitro; azido; alkanoyl (such as a $C_{2-6}$ alkanoyl group such as acyl); carboxamido; $C_{1-6}$ or $C_{1-3}$ alkyl, cycloalkyl, alkenyl, and alkynyl (including groups having at least one unsaturated linkages and from 2 to 8, or 2 to 6 carbon atoms); $C_{1-6}$ or $C_{1-3}$ alkoxys; $C_{6-10}$ aryloxy such as phenoxy; $C_{1-6}$ alkylthio; $C_{1-6}$ or $C_{1-3}$ alkylsulfinyl; $C_{1-6}$ or $C_{1-3}$ alkylsulfonyl; aminodi($C_{1-6}$ or $C_{1-3}$) alkyl; $C_{6-12}$ aryl having at least one aromatic rings (e.g., phenyl, biphenyl, naphthyl, or the like, each ring either substituted or unsubstituted aromatic); $C_{7-19}$ arylalkyl having 1 to 3 separate or fused rings and from 6 to 18 ring carbon atoms; or arylalkoxy having 1 to 3 separate or fused rings and from 6 to 18 ring carbon atoms, with benzyloxy being an exemplary arylalkoxy.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A polycarbonate composition comprising:
   30 to 95 wt % of one or more bisphenol A polycarbonate homopolymers; and
   5 to 70 wt % of a poly(carbonate-siloxane) copolymer with a siloxane content of 10 wt. % to 25 wt. % based on the total weight of the poly(carbonate-siloxane), in an amount effective to provide a total siloxane content of 0.5 wt. % to 17.5 wt. % based on the total weight of the composition;

the poly(carbonate-siloxane) copolymer
comprising bisphenol carbonate units of the formula

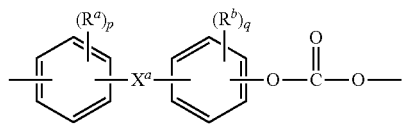

wherein
$R^a$ and $R^b$ are each independently $C_{1-12}$ alkyl, $C_{1-12}$ alkenyl, $C_{3-8}$ cycloalkyl, or $C_{1-12}$ alkoxy,
p and q are each independently 0 to 4, and
$X^a$ is a single bond, —O—, —S—, —S(O)—, —S(O)$_2$—, —C(O)—, a $C_{1-11}$ alkylidene of formula —C($R^c$)($R^d$)— wherein $R^c$ and $R^d$ are each independently hydrogen or $C_{1-10}$ alkyl, or a group of the formula —C(=$R^e$)— wherein $R^e$ is a divalent $C_{1-10}$ hydrocarbon group; and
siloxane units of the formulas

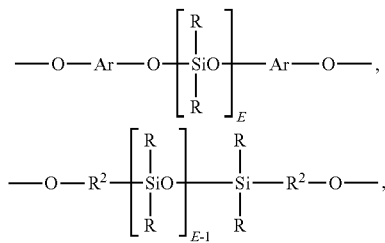

or a combination comprising at least one of the foregoing, wherein
R is each independently a $C_{1-13}$ monovalent hydrocarbon group,
Ar is each independently a $C_{6-30}$ aromatic group,
$R^2$ is each independently a $C_{2-8}$ alkylene group, and
E has an average value of 10 to 100;
wherein in the poly(carbonate-siloxane) copolymer less than 0.5 mol % of the siloxane units are directly coupled to another siloxane units; and further wherein the composition has a tensile yield strength retention of 80% and higher after exposure of an ISO tensile bar for 24 hours to sunscreen under 0.5% strain compared to a non-exposed reference tested according to ISO 22088-3; and
an elongation at break retention of 75% and higher after exposure of an ISO tensile bar for 24 hours to sunscreen under 0.5% strain compared to a non-exposed reference tested according to ISO 22088-3.

2. The composition of claim 1 wherein the composition has a melt volume rate ("MVR"), determined in accordance with ASTM D1238 under a load of 1.2 kg at 300° C., higher than 5 and a ductile/brittle transition temperature of less than or equal to −10° C. determined in accordance with ASTM D256-2010 on a molded part having a thickness of 3.2 mm.

3. The composition of claim 1 further comprising a colorant composition, wherein
a molded sample having a thickness of 1 mm formed from the composition has an average L* value of 29 or less as measure by the CIE Lab method, 10 degree observer, D65 illuminant, specular component included, measured in reflectance mode.

4. The composition of claim 1, wherein a molded article of the composition has reduced aesthetic defects comprising one or more of the following: black streaking; knitline visibility; gate blush; or pearlescence compared to a molded article of a reference composition having the same siloxane loading, but containing a poly(carbonate-siloxane) copolymer comprising bisphenol A carbonate units and siloxane units wherein greater than 20 mol % of the siloxane units are directly coupled to another siloxane unit.

5. The composition of claim 1, wherein a molded article of the composition passes a ball drop impact test without failure after dropping a steel ball of 500 g from a height of 500 mm after Non Conductive Vacuum Metallization (NCVM).

6. The composition of claim 1, wherein a molded article of the composition with a thickness of 3.2 mm thickness has a transmission higher than 50% and a haze less than 25%, measured by HazeGard (ASTM D1003-00).

7. The composition of claim 1, wherein the bisphenol carbonate units of the poly(carbonate-siloxane) are bisphenol A carbonate units and siloxane units of the poly(carbonate-siloxane) are of the formula

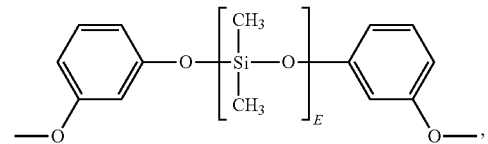

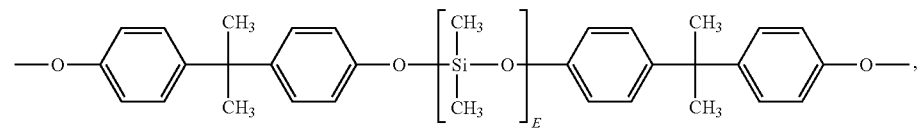

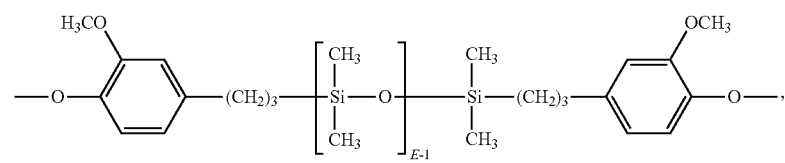

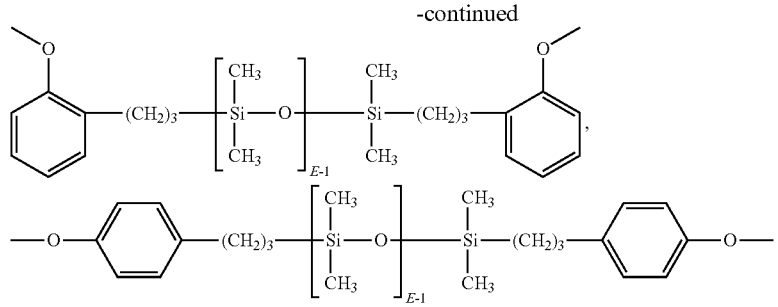

or a combination comprising at least one of the foregoing, wherein E has an average value of 10 to 100.

8. The composition of claim 1, wherein the poly(carbonate-siloxane) is present in an amount of 10 to 30 wt. % based on the sum of the weights of the bisphenol A polycarbonate homopolymer and the poly(carbonate-siloxane).

9. The composition of claim 3 wherein the colorant composition comprises carbon black in an amount of greater than zero and less than 1.5 wt. % based on the total weight of the colorant composition.

10. The composition of claim 1, further comprising a filler composition.

11. The compositions of claim 10, wherein the filler composition comprises $TiO_2$.

12. The composition of claim 10, wherein the filler composition is present in an amount from 1 wt % to 20 wt % based on the total weight of the polycarbonate composition.

13. The composition of claim 1, further comprising a flame retardant, an anti-drip agent, or a combination comprising at least one of the foregoing, wherein optionally the flame retardant comprising an alkali metal salt of a perfluorinated $C_1$-$C_{16}$ alkyl sulfonate, an inorganic acid complex salt, or a combination comprising at least one of the foregoing.

14. The composition of claim 1 further comprising no more than 5 wt. % based on the weight of the composition of a processing aid, a heat stabilizer, an antioxidant, an ultra violet light absorber, or a combination comprising at least one of the foregoing.

15. An article selected from a molded article, a thermoformed article, an extruded film, an extruded sheet, a honeycomb structure, one or more layers of a multi-layer article, a substrate for a coated article, and a substrate for a metallized article made from the composition of claim 1.

16. The article of claim 15 wherein the article is a component of a consumer electronic device selected from a gaming console, a gaming controller, a portable gaming device, a cellular telephone, a television, a personal computer, a tablet computer, a laptop computer, a personal digital assistant, a portable media player, a digital camera, a portable music player, an appliance, a power tool, a robot, a toy, a greeting card, a home entertainment system, and active loudspeaker, or a soundbar, or the article is an electronic housing for an adapter, a cell phone, a smart phone, a GPS device, a laptop computer, a tablet computer, an e-reader, a copier, or a solar apparatus, or the article is an electrical junction box, an electrical connector, an electrical vehicle charger, an outdoor electrical enclosure, a smart meter enclosure, a smart grid power node, a photovoltaic frame, a miniature circuit breaker, or the article is an automotive, scooter, and motorcycle exterior and interior component comprising panels, quarter panels, rocker panels, trim, fenders, battery covers, doors, deck-lids, trunk lids, hoods, bonnets, roofs, bumpers, fascia, grilles, mirror housings, pillar appliqués, cladding, body side moldings, wheel covers, hubcaps, door handles, spoilers, window frames, headlamp bezels, headlamps, tail lamps, tail lamp housings, tail lamp bezels, license plate enclosures, roof racks, and running boards.

17. A method of manufacture of an article, comprising molding, extruding, casting, or shaping the composition of claim 1 to form the article.

* * * * *